United States Patent [19]

Henrick et al.

[11] 3,876,682

[45] Apr. 8, 1975

[54] SUBSTITUTED BENZOATES OF CYCLPROPANE CARBOXYLIC ACIDS

[76] Inventors: Clive A. Henrick, 3177 Manchester Court; Gerardus B. Stall, 3939 Grove, both of Palo Alto, Calif. 94303

[22] Filed: Nov. 16, 1973

[21] Appl. No.: 416,415

Related U.S. Application Data

[63] Continuation-in-part of Ser. No. 367,058, June 4, 1973.

[52] U.S. Cl............................. 260/468 H; 424/306
[51] Int. Cl............................................ C07c 69/74
[58] Field of Search................................ 260/468 H

[56] References Cited
UNITED STATES PATENTS

| | | | |
|---|---|---|---|
| 3,567,740 | 3/1971 | Matsui et al. | 260/347.4 |
| 3,673,237 | 6/1972 | Jamak | 260/468 |

OTHER PUBLICATIONS

Salaun et al., Tet. Letters, 4545, (1968).

*Primary Examiner*—Robert Gerstl
*Attorney, Agent, or Firm*—Lee-Louise H. Priest; Donald W. Erickson

[57] ABSTRACT

Organic esters characterized by the presence of a cyclopropane moiety, synthesis thereof, and compositions thereof for the control of mites and ticks.

5 Claims, No Drawings

SUBSTITUTED BENZOATES OF CYCLPROPANE CARBOXYLIC ACIDS

This is a continuation-in-part of Ser. No. 367,058, filed June 4, 1973.

This invention relates to novel compounds, synthesis thereof, compositions thereof, and the control of mites.

The compounds of the present invention are effective for the control of mites and especially spider mites. Spider mites are plant feeders and cause serious damage to orchard trees, field crops, greenhouse plants and other vegetation. They feed on the foliage or fruit of plants and trees and attack a variety of plants and trees due to their wide distribution. Spider mites of the family Tetranychidae, such as *Tetranychus urticae*, *Tetranychus canadensis*, *Tetranychus cinnabarinus*, *Tetranychus pacificus*, *Bryobia praetiosa*, *Oligonychus pratensis*, *Oligonychus ilicis*, *Panonychus citri*, *Panonychus ulmi*, and similar related species, are of particular biological interest and economic importance. Other mites are those of the family Tarsonemidae, such as *Steneotarsonemus pallidus*.

Compounds of the present invention of the following formula A are effective control agents for mites.

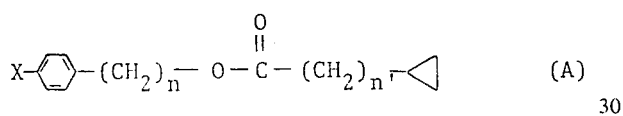

wherein $n$ is a positive integer from 1 to 4;

$n'$ is 0 or a positive integer from 1 to 4; and

X is hydrogen, aryl, aralkyl, alkoxy or aralkoxy.

Hereinafter, each of $n$, $n'$ and X is as defined above unless otherwise specified.

The compounds of formula A are applied to the mite at any stage, namely, during the egg, larvae, nymphal or adult stages in view of their effect in causing inhibition of egg hatching, abnormal development leading to death, inability to pass from one stage to the next, or inability to reproduce. Some of the compounds also exhibit a residual ovicidal effect. A compound of formula A can be applied at dosage levels of the order of 0.001 to 1 percent. Suitable carrier substances include liquid or solid inert carriers, such as water, acetone, xylene, mineral or vegetable oils, talc, vermiculite, and silica. Treatment of mites in accordance with the present invention can be accomplished by spraying, dusting, or otherwise contacting the mites and/or their eggs or larvae directly or indirectly. Generally, a concentration of less than 25 percent of active compound is employed, although a higher concentration of the active compound can be used depending on the type of application apparatus. The formulations can include emulsifying agents and wetting agents to assist in the application and effectiveness of the active ingredient.

Preferred compounds are those compounds of formula A wherein $n'$ is 0 and X is methoxy, ethoxy, phenyl, benzyl, phenoxy, or benzyloxy.

Particularly preferred are those compounds wherein $n$ is 1 and X is methoxy, ethoxy, phenyl or benzyloxy.

The esters of this invention can be prepared using conventional esterification procedures that are well known in the art, for example, by the reaction of an acid halide of the formula

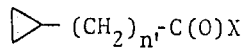

with an alcohol of the formula

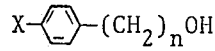

or by direct esterification of the acid with the alcohol in the presence of an acid catalyst.

The acid halides are conveniently prepared by treating the corresponding acid with a halogenating agent such as thionyl chloride, phosphorus pentachloride, or phosphorus tribromide.

Acids of the formula

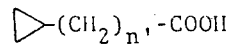

can be prepared from alkyl halides or from cyclopropanemethyl halides. Alkyl halides of the formula

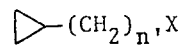

can be prepared by reaction of an alcohol of the formula

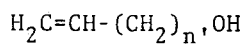

and $CH_2I_2$ in the presence of zinc-copper couple. The reaction is carried out in an inert solvent, such as an ether or hydrocarbon solvent, and proceeds satisfactorily with heating to yield

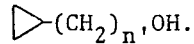

This alcohol intermediate is then converted to the halide with e.g. thionyl chloride in a solvent inert to the reaction and with cooling from $-10°$ to $0°C$. The reaction is carried out in the presence of a base such as pyridine or trialkyl amine.

Cyclopropanemethyl halides ($n'=1$) can also be prepared by treating cyclopropanemethyl alcohol with an aromatic or aliphatic sulfonyl chloride, such as mesyl chloride or tosyl chloride, in pyridine solvent at $0°-10°C$. The corresponding cyclopropanemethyl sulfonate thus formed is then treated with lithium bromide or lithium chloride in a solvent such as acetone to yield the corresponding cyclopropanemethyl chloride or bromide.

Cyclopropanemethyl chloride can also be prepared by treating cyclopropanemethyl alcohol with thionyl chloride according to the procedure described by Caserio et al., Tetrahedron II, 171 (1960).

The alkyl chloride

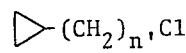

can be conveniently converted to the corresponding acid or acyl halide by reacting it with 1,3-dithiane and n-butyllithium in the presence of N,N,-N', N'-tetramethylethylenediamine. The reaction is chilled to $0°$ to $10°$ for from 7 to 21 days and the intermediate

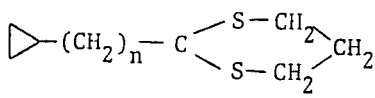

isolated. This intermediate is then treated with boron trifluoride and ether and red mercuric oxide in a solvent inert to the reaction to yield

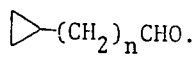

The aldehyde can be oxidized to the acid using $CrO_3$ and sulfuric acid in the presence of acid and water.

The alkyl chloride (except when $n'=1$) can also be treated with magnesium metal and a Grignard initiator in an ether solvent inert to the reaction and then reacted with carbon dioxide to yield the corresponding acid.

The term "aryl," as used herein refers to a monovalent aromatic hydrocarbon group of six to fourteen carbon atoms, such as phenyl, 2-methylphenyl, naphthyl, biphenyl, and the like.

The term "alkoxy" refers to a straight or branched chain saturated hydrocarbonoxy group of one to fifteen carbon atoms, e.g. methoxy, ethoxy, n-propoxy, i-propoxy, n-butoxy, i-butoxy, t-butoxy, n-heptyloxy, n-dodecyloxy, 2-methyloctyloxy, and the like.

The term "aralkyl," as used herein refers to a monovalent hydrocarbon group containing from seven to fifteen carbon atoms in which a hydrogen atom of an alkyl group having a chain length of one to six carbon atoms is substituted by an aryl group, such as benzyl, phenethyl, methylbenzyl, naphthylmethyl and naphthylethyl.

The terms "aryloxy" and "aralkyloxy," as used herein, refer to the groups aryl-O- and aralkyl-O- where aryl and aralkyl are as defined above.

The esters and thioesters of the present invention can be used alone or in an inert carrier substance for the control of mites (Acarina) or can be used in mixture with pesticides and/or juvenile hormone analogs known in the art in order to obtain a broader spectrum of activity. Suitable insecticides include Baygon, Captan, Sevin, Ciodrin, Systox, Diazinon, Vapona, Cygon, Dimethrin, Dursban, Malathion, and Parathion. Typical juvenile hormone analogs which can be used in mixture with the compounds of the present invention are described in Belgian Pat. Nos. 778,241 and 778,242.

The esters and thioesters of the present invention are useful for the control of mites and ticks which are ectoparasitic on animals and birds. The compounds can be applied in either solution or in powder (dust) form in a conventional manner.

The following examples are provided to illustrate the synthesis of the ester of the present invention and the practice of the present invention. Temperature in degrees Centigrade.

EXAMPLE 1

To a suspension of 40.0 g. of 3-buten-1-ol and 90.8 g. zinc-copper couple in 450 ml. of dry ether under nitrogen at room temperature is added about 15 ml. of diiodomethane. The reaction flask is heated externally with a heat gun until the reaction mixture refluxes by itself (about 1 hour). When the initial reflux rate begins to subside, 79 ml. of diiodomethane is added dropwise over a period of one-half hour to maintain a constant reflux rate. The reaction mixture is then heated to reflux by means of a water bath at 40°–45°, refluxed for 5 hours, allowed to sit overnight at room temperature and then refluxed for an additional 6 hours.

The reaction is quenched by first cooling the reaction mixture to room temperature and adding saturated ammonium chloride solution until hydrogen gas evolution ceases and a black precipitate is formed. The reaction mixture is filtered and the solid filtrate washed twice with ether. The ether phase is then washed with a saturated aqueous solution of ammonium chloride, 3N sulfuric acid, 10 percent sodium bicarbonate, water and brine. The reaction mixture is then filtered, dried over calcium sulfate, filtered through activity III alumina, concentrated at atmospheric pressure, and distilled at reduced pressure to yield 25.8 g. of crude 2-cyclopropaneethyl alcohol.

Using the procedure of this example, 3-cyclopropanepropyl alcohol and 4-cyclopropanebutyl alcohol are prepared from 4-penten-1-ol and 5-hexen-1-ol.

EXAMPLE 2

To a solution of 29.01 g. of cyclopropaneethyl alcohol and 52.3 mls. tributyl amine (specific gravity = 0.778) in 200 mls. of anhydrous ether at 0° under nitrogen is added dropwise 15.8 mls. of thionyl chloride (specific gravity = 1.655). The reaction mixture is stored at –3° for 4 days and then poured into an ether/water mixture. The water phase is decanted away and the ether phase is washed with 5 percent sodium hydrogen carbonate, water, and brine and then dried over calcium sulfate, concentrated at atmospheric pressure and distilled at reduced pressure to yield 2-cyclopropaneethyl chloride.

Using the procedure of this example, cyclopropanemethyl chloride, 2-cyclopropaneethyl chloride, 3-cyclopropanepropyl chloride and 4-cyclopropanebutyl chloride are prepared from cyclopropanemethyl alcohol, cyclopropaneethyl alcohol, 3-cyclopropanepropyl alcohol and 4-cyclopropanebutyl alcohol respectively.

EXAMPLE 3

A mixture of 9.9 g. of 2-cyclopropaneethyl chloride, 150 mls. of anhydrous tetrahydrofuran, 2.41 of magnesium metal, and 0.87 g. of ethylene dibromide is heated to near boiling point for 1 hour. An additional 0.114 g. magnesium and 0.89 g. of ethylene bromide is then added and the reaction mixture is boiled for 4.25 hours at which time most of the magnesium metal has disappeared. Dry carbon dioxide gas is then added over a period of 1 hour to the reaction mixture which is cooled with a water bath and stirred vigorously during this time. The reaction mixture is stirred overnight at 24° and then ether, water, and 3N sulfuric acid is added. The aqueous phaase is separated and extracted twice with a 1:1 mixture of ether and pentane. The combined ether layers are washed with water and brine and then dried over calcium sulfate. The solvent is removed by rotary evaporation to yield 8.11 g. of 3-cyclopropanepropionic acid.

Using the procedure of this example, 4-cyclopropanebutyric acid and 5-cyclopropanevaleric acid are prepared from the corresponding chlorides prepared in Example 2.

EXAMPLE 4

To a mixture of 23.5 g. of 1,3-dithiane in 500 mls. of anhydrous tetrahydrofuran at −30° under nitrogen is added 133 mls. of 1.51 M n-butyllithium in hexane solution over a period of one-half hour. The reaction mixture is stirred at −30° to −20° for 2 hours, warmed to −10°, and 23.5 g. of cyclopropanemethyl chloride and 15 mls. of N,N,N′,N′-tetramethylethylene diamine in 24 mls. of tetrahydrofuran is added. The reaction mixture is then refrigerated at 3° for 14 days. Ether, pentane, and water are then added and the mixture is acidified with 100 mls. of aqueous 3N sulfuric acid. The aqueous layer is separated and extracted with a mixture of ether and pentane. The combined organic layers are then washed with water and brine, dried over calcium sulfate, and the solvent removed to yield 33.6 g. of a pale yellow product, 2-(cyclopropanemethyl)-1,3-dithiane.

To 230 mls. of aqueous tetrahydrofuran (15 percent water) is added 38.1 g. of boron trifluoride-ethyl ether, followed by 58 g. of red mercuric oxide. To this mixture is then added dropwise 23.4 g. of 2-(cyclopropanemethyl)-1,3-dithiane in 10 mls. of tetrahydrofuran. The mixture is stirred for 5 hours and then allowed to remain at 24° overnight. Ether (200 mls.) is added to the mixture and the upper phase decanted, washed twice with potassium carbonate, twice with brine and then dried over calcium sulfate. The mixture is filtered into a 15 cm. Vigreux distillation apparatus and the solvent removed at 42°–73° to yield cyclopropaneacetaldehyde.

EXAMPLE 5

To a mixture of 0.10 g. of cyclopropaneacetaldehyde and 1 ml. of anhydrous acetone is added at 24° enough Jones Reagent (67 g. chromium trioxide, 125 mls. water, 58 mls. concentrated sulfuric acid, water to dissolve salts) to produce a persistent orange color. After 5 minutes, 50 mls. of ether and 10 mls. of water is added, the organic layer is separated and washed twice with 20 ml. portions of aqueous saturated sodium chloride solution and then dried over calcium sulfate. The solvent is removed by rotary evaporation to yield 0.12 g. of pale yellow liquid, cyclopropane acetic acid.

EXAMPLE 6

To a mixture of 1.14 g. of 3-cyclopropanepropionic acid, 30 mls. of anhydrous ether, and 1.1 mls. of thionyl chloride ($d_{10} = 1.66$), at 24°, is added 0.2 mls. of dimethyl formamide. The mixture is stirred for 45 minutes and then the upper of the two layers is decanted away. Excess thionyl chloride and solvent is removed by rotary evaporation to yield, a pale orange liquid, 3-cyclopropanepropionyl chloride.

Using the procedure of this example, cyclopropaneacetyl chloride, 4-cyclopropanebutyryl chloride, and 5-cyclopropanepentanoyl chloride are prepared from the acids of Examples 3 and 5 and cyclopropanecarbonyl chloride is prepared from cycloproppanecarboxylic acid.

EXAMPLE 7

To a solution of 0.09 g. of 3-cyclopropanepropionic acid and 1.00 ml. of thionyl chloride in 10 ml. of ether at room temperature is added 0.25 ml. of dimethylformamide. The reaction mixture is stirred overnight and the ethereal phase separated. The residue is washed with hexane and combined with the ether phase. The solvent is then removed by evaporation to yield 3-cyclopropanepropionic acid chloride.

To a solution of the above acid chloride in 20 ml. of ether at 0°C under nitrogen is added 0.93 g. of p-methoxybenzyl alcohol and 0.95 ml. of pyridine. The reaction mixture is allowed to warm to room temperature and is then stirred for 8 days.

The reaction mixture is then taken up in a mixture of ether and water, the ether layer is removed, and the aqueous phase is extracted once with ether. The combined ether phases are washed with 2N sulfuric acid, 10 percent sodium carbonate, water, saturated copper sulfate, water, and brine, dried over calcium sulfate, and the solvent removed to yield 1.42 g. of p-methoxybenzyl 3-cyclopropanepropionate, boiling point 115° at 0.15 mm.

Following the procedure of Example 7, the alcohols of Column I are reacted with the acids of Examples 3 and 5 to yield the esters of Column II.

I p-phenylbenzyl alcohol
p-benzylbenzyl alcohol
p-methoxybenzyl alcohol
p-ethoxybenzyl alcohol
p-isopropoxybenzyl alcohol
p-phenoxybenzyl alcohol
p-benzyloxybenzyl alcohol
p-naphthylbenzyl alcohol
p-naphthyloxybenzyl alcohol
p-(β-phenethyl)benzyl alcohol
p-(4-methylphenyl)benzyl alcohol
p-n-butylbenzyl alcohol
p-n-octylbenzyl alcohol
2-(biphenylyl)ethanol
2-(p-methoxyphenyl)ethanol
2-(p-ethoxyphenyl)ethanol
2-(p-benzyloxyphenyl)ethanol
3-(p-benzyloxyphenyl)propanol
3-(p-biphenylyl)propanol
3-(p-methoxyphenyl)propanol
4-(p-benzyloxyphenyl)butanol
4-(p-biphenylyl)butanol
4-(p-ethoxyphenyl)butanol

II p-phenylbenzyl 3-cyclopropanepropionate
p-benzylbenzyl cyclopropaneacetate
p-methoxybenzyl 4-cyclopropanebutyrate
p-ethoxybenzyl 5-cyclopropanevalerate
p-isopropoxybenzyl 3-cyclopropanepropionate
p-phenoxybenzyl 3-cyclopropanepropionate
p-benzyloxybenzyl 3-cyclopropanepropionate
p-naphthylbenzyl 3-cyclopropanepropionate
p-naphthyloxybenzyl cyclopropaneacetate
p-(β-phenethyl)benzyl 4-cyclopropanebutyrate
p-(4-methylphenyl)benzyl 5-cyclopropanevalerate
p-n-butylbenzyl 3-cyclopropanepropionate
p-n-octylbenzyl 3-cyclopropanepropionate
2-(biphenylyl)ethyl 3-cyclopropanepropionate
2-(p-methoxyphenyl)ethyl 3-cyclopropanepropionate
2-(p-ethoxyphenyl)ethylcyclopropaneacetate 2-(p-benzyloxyphenyl)ethyl 4-cyclopropanebutyrate
3-(p-benzyloxyphenyl)propyl 5-cyclopropanevalerate
3-(p-biphenylyl)propyl 3-cyclopropanepropionate
3-(p-methoxyphenyl)propyl 3-cyclopropanepropionate
4-(p-benzyloxyphenyl)butyl 3-cyclopropanepropionate
4-(p-biphenylyl)butyl 3-cyclopropanepropionate
4-(p-ethoxyphenyl)butyl cyclopropaneacetate

EXAMPLE 8

To a solution of 1.84 g. of p-phenylbenzyl alcohol in 100 ml. of ether at room temperature is added 1 ml. of cyclopropanecarboxylic acid chloride and 1 ml. of pyridine. A precipitate forms immediately. The reaction mixture is stirred for 2 days, water is added, and the ether phase is separated. The organic ether portion is then washed with 3N sulfuric acid, water, 2N potassium carbonate, water, copper sulfate, water and brine. The product is dried over calcium sulfate and the solvent is removed by evaporation to yield p-phenylbenzyl cyclopropanecarboxylate, melting point 59°–61°.

Using the procedure of Example 8, the alcohols of Column III are reacted with cyclopropanecarboxylic acid chloride to yield the esters of Column IV.

III p-ethoxybenzyl alcohol
p-methoxybenzyl alcohol
benzyl alcohol

IV p-ethoxybenzyl cyclopropanecarboxylate b.p. 100°/0.15 mm.
p-methoxybenzyl cyclopropanecarboxylate b.p. 103°–140°/0.25 mm.
benzyl cyclopropanecarboxylate b.p. 68°–70°/0.25 mm.

EXAMPLE 9

To a solution of 4.24 g. of p-benzyloxybenzenecarbaldehyde in 30 ml. of tetrahydrofuran, under nitrogen, 10 ml. of 1 M diborane in tetrahydrofuran is added dropwise with cooling. The reaction mixture is stirred overnight. Water (100 ml.) is then slowly added, then ether, followed by sufficient aqueous 2N sulfuric acid to bring the aqueous phase to pH2. The organic layer is then separated, washed with water, brine and then dried. Solvent removal yields 4.3 g. of p-benzyloxybenzyl alcohol.

The benzyloxybenzyl alcohol, prepared above, is dissolved in 100 ml. ether and 3.12 g. of cyclopropanecarboxylic acid chloride and 3.9 g. of pyridine are added. The reaction mixture is stirred overnight and then is worked up as in Example 8 to yield benzyloxybenzyl cyclopropanecarboxylate, melting point 33°–36°.

Using the procedure of Example 9, the aldehydes of Column V are used to prepare the corresponding alcohols which are then reacted with cyclopropanecarboxylic acid chloride to yield the esters of Column VI.

V p-benzylbenzenecarbaldehyde
p-isopropoxybenzenecarbaldehyde
p-phenoxybenzenecarbaldehyde
p-naphthylbenzenecarbaldehyde
p-tolylbenzenecarbaldehyde
p-n-propoxybenzenecarbaldehyde
p-n-octyloxybenzenecarbaldehyde
p-n-butoxybenzenecarbaldehyde
p-phenethylbenzenecarbaldehyde
p-n-hexyloxybenzenecarbaldehyde

VI p-benzylbenzyl cyclopropanecarboxylate
p-isopropoxybenzyl cyclopropanecarboxylate
p-phenoxybenzyl cyclopropanecarboxylate
p-naphthylbenzyl cyclopropanecarboxylate
p-tolylbenzyl cyclopropanecarboxylate
p-n-propoxybenzyl cyclopropanecarboxylate
p-n-octyloxybenzyl cyclopropanecarboxylate
p-n-butoxybenzyl cyclopropanecarboxylate
p-phenethylbenzyl cyclopropanecarboxylate
p-n-hexyloxybenzyl cyclopropanecarboxylate A wettable powder suitable for field application after dilution can be formulated by blending and then air-milling a mixture of 20 to 30 percent of an ester of this invention, 60 to 70 percent of a solid carrier such as Attaclay X-250, 1 to 3 percent of an anionic surfactant, such as Igepon T-77, and 3 to 5 percent of a dispersing agent such as Marasperse N-22.

The wettable powder is applied, after dilution with water, using ultra-low volume sprayers. Dilutions containing the ester within a concentration range of about 0.01 to 10 percent are generally employed.

The compound p-phenylbenzyl cyclopropanecarboxylate can be formulated as a 25 percent active ingredient dust having the following composition:

| | |
|---|---|
| p-phenylbenzyl cyclopropanecarboxylate | 25% |
| Synthetic Calcium Silicate | 5% |
| Attapulgite Clay | 68.5% |
| Dust Inhibitor and Sticker | 1.5% |

The compound p-benzyloxybenzyl cyclopropanecarboxylate is formulated as an emulsifiable concentrate having the following composition:

| | |
|---|---|
| p-benzyloxybenzyl cyclopropanecarboxylate | 57.5% |
| Xylene | 34.5% |
| Mixture of nonionic and anionic surfactants | 8.0% |

The mite control agents of the present invention can be used alone in an inert agriculturally acceptable carrier substance for the control of mites (Acarina) or can be used in mixture with insecticides and/or juvenile hormone analogs known in the art to provide a broader spectrum of activity.

The effectiveness of the compounds of the present invention is demonstrated below.

Adults (*Tetranychus urticae*) are allowed to oviposit for 24 hours on castor bean leaf discs (diameter 1 cm.) on moist cottonwool.

After 24 hours, the adults are removed and the leaf discs are then dipped in acetone solutions of p-phenylbenzyl cyclopropanecarboxylate and of p-benzyloxybenzyl cyclopropanecarboxylate at 0.1 percent.

After submersion for 1 second, the solvent on the leaf discs is allowed to dry and the leaf discs are then glued to a plastic petri dish to prevent crumpling.

6 days later (when all the eggs on untreated discs have emerged), the number of unhatched eggs is calculated as a percentage of the total number originally present, corrected for any spontaneous non-emergence observed in control discs treated only with solvent (Abbott correction).

Both p-phenylbenzyl cyclopropanecarboxylate and p-benzyloxybenzyl cyclopropanecarboxylate at the above concentration prevent the hatching of 100 percent of the eggs.

We claim as our invention:

1. A compound of the formula

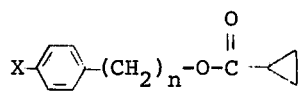

wherein X is methoxy, ethoxy, phenyl, benzyl, phenoxy or benzyloxy and $n$ is a positive integer from 1 to 4.

2. A compound according to claim 1 wherein $n$ is 1 and X is methoxy, ethoxy, phenyl or benzyloxy.

3. The compound p-benzyloxybenzyl cyclopropanecarboxylate, according to claim 2.

4. The compound p-phenylbenzyl cyclopropanecarboxylate, according to claim 2.

5. A compound of the formula

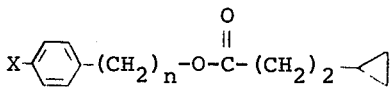

wherein X is alkoxy of one to three carbon atoms, phenyl, benzyl, phenoxy, or benzyloxy and $n$ is a positive integer from 1 to 4.

* * * * *